(12) United States Patent
Shi et al.

(10) Patent No.: US 11,675,058 B2
(45) Date of Patent: Jun. 13, 2023

(54) LIGHT DETECTION AND RANGING SYSTEM

(71) Applicant: ZVISION TECHNOLOGIES CO., LTD., Beijing (CN)

(72) Inventors: Tuo Shi, Beijing (CN); Bingbing Xia, Beijing (CN); Jiayao Liu, Beijing (CN)

(73) Assignee: Zvision Technologies Co., Ltd., Beijing (CN)

( * ) Notice: Subject to any disclaimer, the term of this patent is extended or adjusted under 35 U.S.C. 154(b) by 367 days.

(21) Appl. No.: 16/958,719

(22) PCT Filed: Oct. 16, 2018

(86) PCT No.: PCT/CN2018/110336
§ 371 (c)(1),
(2) Date: Jun. 28, 2020

(87) PCT Pub. No.: WO2020/077514
PCT Pub. Date: Apr. 23, 2020

(65) Prior Publication Data
US 2021/0011128 A1 Jan. 14, 2021

(30) Foreign Application Priority Data

Oct. 15, 2018 (CN) .......................... 201811194721.5

(51) Int. Cl.
*G01S 7/484* (2006.01)
*G01S 7/481* (2006.01)
(Continued)

(52) U.S. Cl.
CPC .............. *G01S 7/484* (2013.01); *G01S 7/481* (2013.01); *G01S 7/4815* (2013.01);
(Continued)

(58) Field of Classification Search
CPC ...... G01S 7/484; G01S 7/4817; G01S 7/4861; G01S 17/42; G01S 7/481; G01S 7/4815;
(Continued)

(56) References Cited

U.S. PATENT DOCUMENTS 9,709,677 B2    7/2017 Eisele et al.
2009/0115994 A1 5/2009 Stettner
(Continued)

FOREIGN PATENT DOCUMENTS

CN    103364775 A    10/2013
CN    103792541 A    5/2014
(Continued)

OTHER PUBLICATIONS

Supplementary Partial European Search Report in the European application No. 18937053.9, dated Feb. 8, 2021.
(Continued)

*Primary Examiner* — Jennifer D Bennett
*Assistant Examiner* — Erin R Garber
(74) *Attorney, Agent, or Firm* — Syncoda LLC; Feng Ma

(57) ABSTRACT

A light detection and ranging (LIDAR) includes: a light-emitting unit, a light receiving unit and a control unit. In the light emitting unit, first light from a first light source, after being reflected by a first surface of a first mirror, reaches the scan unit. In the light emitting unit, second light from a second light source, after being reflected by a second mirror and transmitted through the first mirror via a second surface of the first mirror, reaches the scan unit, using an overlapping path with the first light. Light intensity of the second light transmitted through the first mirror is lower than that of the first light reflected by the first mirror. The control unit enables only the first light source, and in response to determining that measurements from the light receiving unit
(Continued)

are saturated, automatically switches off the first light source and enable the second light source.

11 Claims, 17 Drawing Sheets

(51) Int. Cl.
   *G01S 7/4861* (2020.01)
   *G01S 7/4863* (2020.01)
   *G01S 17/08* (2006.01)
   *G01S 17/42* (2006.01)
(52) U.S. Cl.
   CPC .......... *G01S 7/4816* (2013.01); *G01S 7/4817* (2013.01); *G01S 7/4861* (2013.01); *G01S 7/4863* (2013.01); *G01S 17/08* (2013.01); *G01S 17/42* (2013.01)
(58) Field of Classification Search
   CPC ...... G01S 7/4863; G01S 7/4816; G01S 17/08; G01S 7/4808; G01S 17/89; G01S 7/497; G01S 7/499; G02B 26/105; G02B 26/10; G02B 26/0833; G02B 2027/014; G02B 27/0172; G02B 27/30; G02B 19/0085
   See application file for complete search history.

(56) References Cited

U.S. PATENT DOCUMENTS

| | | | |
|---|---|---|---|
| 2010/0165322 A1* | 7/2010 | Kane | G01S 7/481 356/4.01 |
| 2012/0249999 A1 | 10/2012 | Stettner | |
| 2012/0262696 A1 | 10/2012 | Eisele | |
| 2013/0110390 A1 | 5/2013 | Stettner | |
| 2014/0063200 A1 | 3/2014 | Stettner et al. | |
| 2015/0293226 A1 | 10/2015 | Eisele | |
| 2015/0331112 A1* | 11/2015 | Stettner | G01S 7/4814 701/28 |
| 2017/0242102 A1 | 8/2017 | Dussan et al. | |
| 2017/0242105 A1 | 8/2017 | Dussan et al. | |
| 2017/0242106 A1 | 8/2017 | Dussan et al. | |
| 2017/0242107 A1 | 8/2017 | Dussan et al. | |
| 2017/0242109 A1 | 8/2017 | Dussan et al. | |
| 2017/0301716 A1 | 10/2017 | Irish et al. | |
| 2017/0350983 A1 | 12/2017 | Hall et al. | |
| 2018/0074175 A1 | 3/2018 | O'Keeffe | |
| 2018/0128920 A1 | 5/2018 | Keilaf et al. | |
| 2018/0180470 A1* | 6/2018 | Seitz | G01S 7/4863 |
| 2019/0009704 A1* | 1/2019 | Yagi | B60Q 1/0035 |
| 2019/0072652 A1* | 3/2019 | Morikawa | G01S 7/4876 |
| 2019/0310489 A1* | 10/2019 | Nothern, III | H01S 5/4075 |
| 2020/0033456 A1* | 1/2020 | Wang | H04N 9/045 |
| 2020/0355802 A1* | 11/2020 | Holleczek | G01S 7/4817 |
| 2021/0003679 A1 | 1/2021 | Dussan et al. | |

FOREIGN PATENT DOCUMENTS

| | | |
|---|---|---|
| CN | 103954971 A | 7/2014 |
| CN | 105974393 A | 9/2016 |
| CN | 107247269 A | 10/2017 |
| CN | 108594206 A | 9/2018 |
| CN | 209014727 U | 6/2019 |
| WO | 2017210418 A1 | 12/2017 |

OTHER PUBLICATIONS

English translation of the Written Opinion of the International Search Authority in the international application No. PCT/CN2018/110336, dated Jul. 19, 2019.

Supplementary European Search Report in the European application No. 18937053.9, dated Jun. 8, 2021.

International Search Report in the international application No. PCT/CN2018/110336, dated Jul. 19, 2019.

* cited by examiner

LIGHT DETECTION AND RANGING SYSTEM

CROSS-REFERENCE TO RELATED APPLICATIONS

The present application is a national stage of International Application No. PCT/CN2018/110336 filed on Oct. 16, 2018, which claims priority to Chinese Patent Application No. 201811194721.5 filed on Oct. 15, 2018. The disclosures of these applications are hereby incorporated by reference in their entirety.

TECHNICAL FIELD

Embodiments of the present disclosure generally relate to a LIDAR system, and more particularly relate to a LIDAR system enabling non-coaxial reception.

BACKGROUND

LIDAR (light detection and ranging) is a technology that measures profiles such as position and speed of a target by emitting a laser beam to the target and receiving a reflected light beam from the target. For conventional LIDAR systems, a single photodetector or a one-dimensional photodetector array (i.e. one row of photodetectors or one column of photodetectors) is usually leveraged to receive the reflected light beam. The light receiving surface of the photodetector is always larger than spot size of the reflected light beam. In addition to the desired reflected light from the target, light reaching the light receiving surface of the photodetector possibly further includes noise from other objects in the field of view (FoV) (e.g., strong sunlight, or light beams from other LIDAR systems). When a LIDAR system is applied to a high-speed remote-distance (e.g., hundreds of meters) scene (e.g., an Advanced Driver Assistance System (ADAS)), the reflected light reaching the photodetector substantially has a weak power, such that in the presence of relatively strong obtrusive light, the output signal-to-noise ratio (SNR) of the photodetector would be significantly deteriorated, which causes the LIDAR system unable to function properly.

U.S. Patent Application No. US2018/0128920A1 discloses that a sensor of the LIDAR system may leverage a two-dimensional array of detectors (e.g., avalanche photodiodes (APD) or single photon avalanche diodes (SPAD)). The size of the array depends on the desired resolution, signal to noise ratio (SNR), and desired detection distance. Although application of the two-dimensional detector array may enhance the resolution, SNR, and detection distance to a certain extent, influence from noise in the environment on the SNR cannot be eliminated.

U.S. Patent Application No. US2017/0301716A1 discloses that an optical sensor of the LIDAR includes an array of SPADs, where each row of SPADs share one row-select transistor and each column of SPADs share one column-select transistor. The transistors can be MOSFETs or BJTs. Corresponding rows and columns in the photodetector array are selected based on a predicted spot size and angle, thereby reducing the influence from stray light other than the desired reflected light.

U.S. Patent Application No. 2018/0074175A1 discloses arranging a spatial light modulator in front of a photodetector of the LIDAR system. The spatial light modulator may be adjusted to create an aperture that allows or blocks light transmittance. Position of the aperture is adjusted based on the direction of the steerable laser. As such, other ambient light can be effectively blocked and the signal-to-noise ratio can be enhanced.

SUMMARY

A technical problem to be solved by the present disclosure is to provide a LIDAR enabling non-coaxial reception, which may enhance resolution and signal-to-noise ratio and significantly eliminate the influence from ambient noise on the signal-to-noise ratio.

The present disclosure provides a technical solution below.

According to one aspect of the present disclosure, there is provided a LIDAR system, comprising: a light emitting unit configured for emitting light to a target, wherein the light emitting unit includes a light source and a scan unit, the scan unit being configured for reflecting light from the light source with a controllable angle of deflection so as to scan the target; a light receiving unit configured for receiving the light reflected from the target object and outputting measurements, wherein the light receiving unit comprises photoelectric sensing means; a control unit communicatively coupled to the light emitting unit and the light receiving unit, wherein the control unit is configured for controlling the light emitting unit to process the measurement and controlling the angle of deflection of the scan unit, wherein the optical path along which the light emitted from the light emitting unit travels to the target is non-coaxial with the optical path along which the light reflected from the target travels to the light receiving unit.

According to a first aspect of the light emitting unit of the present disclosure, the light emitting unit comprises: a first light source configured for emitting first light; a second light source configured for emitting second light; the scan unit is configured for reflecting the first light and second light incident thereon with an angle of deflection; a first mirror comprising a first surface and a second surface which are oppositely positioned, wherein the first light, after being reflected by the first surface of the first mirror, reaches the scan unit; and a second mirror configured for reflecting the second light, wherein the reflected second light, after being transmitted through the first mirror via the second surface of the first mirror, reaches the scan unit, wherein the optical path along which the first light reflected off the first mirror travels overlaps with the optical path along which the second light reflected off the second mirror travels.

According to a second aspect of the light emitting unit of the present disclosure, the light emitting unit in the first aspect comprises: a third light source configured for emitting third light; and a third mirror configured for reflecting the third light, wherein the second mirror comprises a first surface and a second surface which are oppositely positioned, the second light being reflected by the first surface of the second mirror, and the reflected third light, after being transmitted sequentially through the second surface of the second mirror and the second surface of the first mirror, reaching the scan unit, wherein the optical path along which the third light reflected off the third mirror travels overlaps with the optical path along which the second light reflected off the second mirror travels.

According to a third aspect of the light emitting unit of the present disclosure, the first light source and the second light source in the first aspect refer to a same light source, and the position of the same light source may be adjusted such that the optical path along which the light emitted at a first position travels after being reflected by the first mirror overlaps with the optical path along which the light emitted at a second position travels after being reflected by the second mirror.

According to a fourth aspect of the light emitting unit of the present disclosure, the light emitting unit comprises: a first light source configured for emitting a first light; a second light source configured for emitting a second light, wherein the direction of polarization of the first light is vertical to that of the second light; the scan unit is configured for reflecting the first light and second light incident thereon with a deflection angle; and a polarizing beam splitter configured for reflecting the first light and transmitting the second light, wherein the reflected first light and the transmitted second light reach, via the overlapping optical path, a same position on the scan unit.

According to a fifth aspect of the light emitting unit of the present disclosure, the light emitting unit comprises: a light source, a scan unit, and an optical element, wherein the optical element is configured for allowing part of reflected light incident thereon from the scan unit to be reflected while allowing the other part to be transmitted through; a photodetector assembly comprising an arrangement of a plurality of photodetectors, the photodetector assembly being configured for receiving the reflected light from the optical element and outputting photocurrent, wherein the light emitting unit further comprises a processing circuit, the processing circuit being coupled to the photodetector assembly, wherein the processing circuit computes the deflection angle of the scan unit based on the photocurrent outputted by each photodetector in the plurality of photodetectors. The control unit is coupled to the processing circuit and the scan unit and is configured to adjust the scan unit based on the computed deflection angle.

According to a sixth aspect of the light emitting unit of the present disclosure, the light emitting unit further comprises: a focusing lens disposed between the light source and the scan unit, the focusing lens being configured for focusing the light emitted from the light source onto the scan unit; and a collimating lens, configured for collimating the light reflected from the scan unit.

According to a seventh aspect of the light emitting unit of the present disclosure, the light emitting unit in the sixth aspect further comprises a beam expander configured for performing beam-expansion to the light collimated by the collimating lens.

According to an eighth aspect of the light emitting unit of the present disclosure, the light emitting unit in the sixth aspect further comprises: a second light source configured for emitting second light; a second focusing lens disposed between the second light source and the scan unit, the second focusing lens being configured for focusing the light emitted from the second light source onto the scan unit; and a second collimating lens configured for collimating the second light reflected from the scan unit, wherein the light from the light source and the light from the second light source are focused onto a same position of the scan unit.

According to the first aspect of the light receiving unit of the present disclosure, the light receiving unit comprises photoelectric sensing means, the photoelectric sensing means including: a two-dimensional photodetector array including a plurality of photodetectors; and a two-dimensional readout circuit array including a plurality of readout circuit units; wherein the plurality of readout circuit units are in one-to-one correspondence with the plurality of photodetectors, each readout circuit unit including a selector switch. The photoelectric sensing means of the light receiving unit further includes a plurality of electrical connectors for coupling the two-dimensional photodetector array and the two-dimensional readout circuit array. Each electrical connector couples each photodetector and the corresponding readout circuit unit by bump-bonding or bridge-bonding.

According to a second aspect of the light receiving unit of the present disclosure, the light receiving unit comprises photoelectric sensing means, the photoelectric sensing means including: a photodetector array including a first number of photodetectors; and a readout circuit including a switch array and a second number of post-processing circuits, wherein the number of selector switches in the switch array is the product of the first number and the second number, wherein the switch array is configured for connecting the output of any one of the first number of photodetectors to any one of the second number of post-processing circuits. Particularly, the readout circuit further comprises a first number of trans-impedance amplifiers in one-to-one correspondence with the first number of photodetectors, each trans-impedance amplifier being configured for amplifying a signal outputted from the corresponding photodetector.

According to a third aspect of the light receiving unit of the present disclosure, the light receiving unit comprises photoelectric sensing means, the photoelectric sensing means including: a photodetector array including a plurality of photodetectors; and an optical shutter including a light-transmitting portion and a light-blocking portion, wherein light reaches, through the light-transmitting portion, the corresponding photodetector in the photodetector array, wherein position of the light-transmitting portion on the optical shutter is electrically adjustable.

The technical solution of the present disclosure offers the following benefits: it avoids the drawback that in the prior art, the SPAF detector in the optical sensor cannot eliminate dark counts; it can accurately measure distance information relative to the surrounding three-dimensional spatial environment, and meanwhile can suppress the impact from a background light and other stray light to a greater extent, thereby implementing rapid and efficient modulation of the spatial light.

BRIEF DESCRIPTION OF THE DRAWINGS

To elucidate the technical solutions in the embodiments of the present disclosure or in the prior art, the drawings used in describing the embodiments of the present disclosure or the prior art will be briefly introduced below. It is apparent that the drawings as described only relate to some embodiments of the present disclosure. To those skilled in the art, other drawings may be derived based on these drawings without exercise of inventive work, wherein.

DETAILED DESCRIPTION

To make the objects, technical solutions, and advantages of the embodiments of the present disclosure much clearer, the technical solutions in the embodiments of the present disclosure will be described clearly and comprehensively with reference to the accompanying drawings; apparently, the embodiments as described are only part of the embodiments of the present disclosure, rather than all of them. All other embodiments obtained by those skilled in the art without exercise of inventive work based on the examples in the embodiments all fall within the protection scope of the present disclosure.

LIDAR (light detection and ranging) is a technology that measures profiles such as position and speed of a target by emitting a laser beam to the target and detecting the reflected light from the target. A LIDAR system performs measurement based on the following principles: triangulation ranging, ToF (Time of Flight)-based pulse ranging, or phase ranging.

Figure 1:
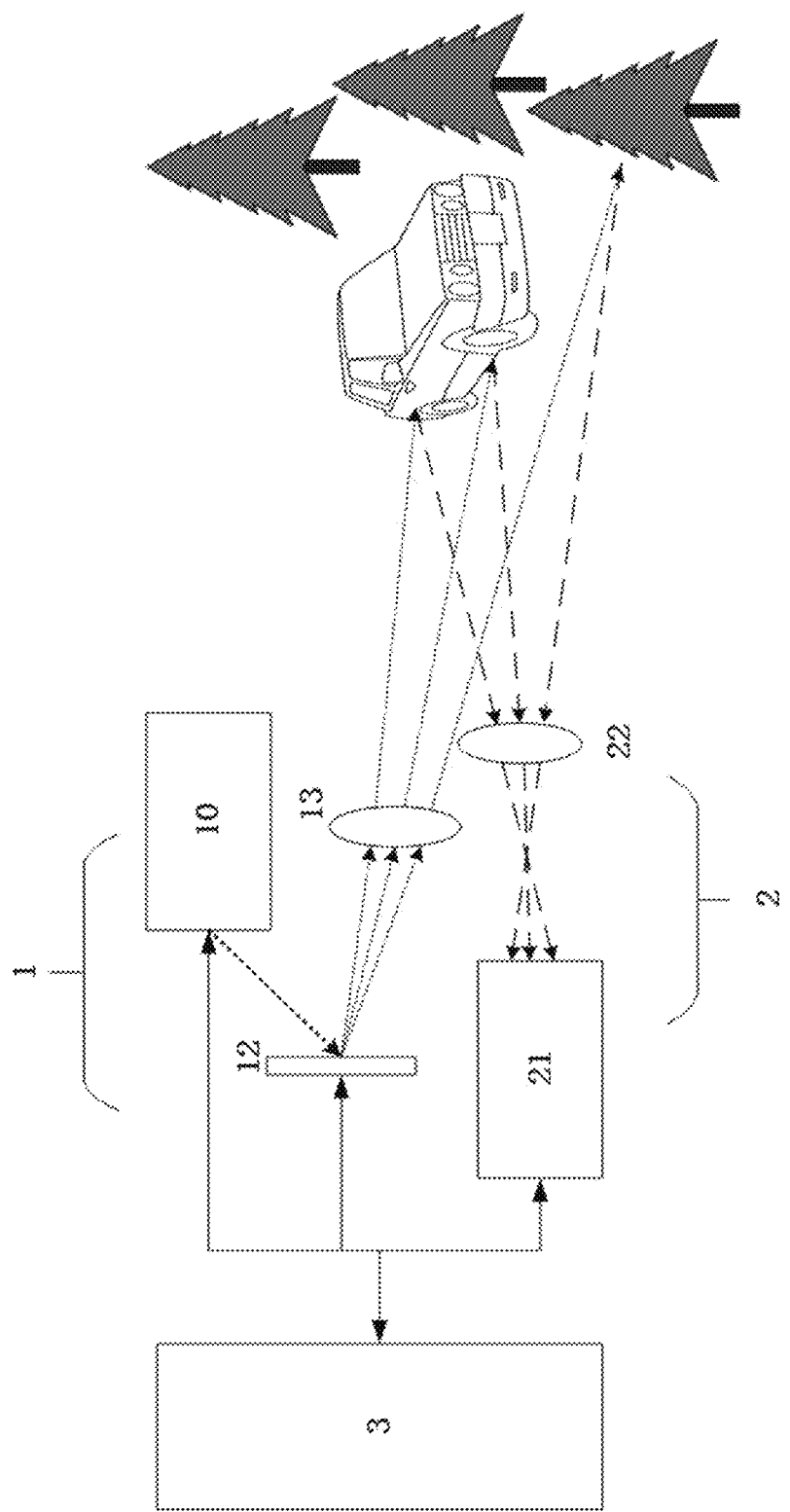
FIG. 1 is a structural diagram of a LIDAR system according to an embodiment of the present disclosure.

FIG. 1 illustrates a schematic diagram of a LIDAR system according to an embodiment of the present disclosure. The LIDAR system comprises a light emitting unit 1, a light receiving unit 2, and a control unit 3. In a LIDAR system enabling non-coaxial reception, the optical path along which the light emitted from the light emitting unit travels to the target is arranged parallel to the optical path along which the reflected light travels from the target object to the light receiving unit, without intersections.

The light emitting unit 1 is configured for emitting a laser beam to the target. The light emitting unit 1 comprises a light source 10. The light source 10 may be a laser, e.g., a solid-state laser, a laser diode, or a high-power laser. The light source 10 may also comprise an LED (Light-Emitting Diode). The light source may emit different forms of light, including pulse, continuous wave (CW), and quasi-continuous wave. The laser may be a vertical cavity surface emitting laser (VCSEL) or an external-cavity diode laser (ECDL). The operating wavelength of the light source 10 may range from 650 nm to 1150 nm, or from 800 nm to 1000 nm, or from 850 nm to 950 nm, or from 1300 nm to 1600 nm. The light emitting unit 1 may comprise an optical assembly optically coupled to the light source 10, the optical assembly being configured for collimating or focusing the beam emitted from the light source.

The light emitting unit 1 may further comprise a scan unit 12 configured for deflecting the direction of the light beam from the light source 10 so as to scan the target, thereby achieving a wider field of view (FOV). The scan unit 12 may comprise a MEMS mirror, a prism, a mechanical mirror, polarization grating, or an optical phased array (OPA), etc. For the MEMS mirror, the reflective mirror surface is rotated or translated in a one-dimensional or two-dimensional direction under electrostatic/piezoelectric/electromagnetic actuation.

The light emitting unit 1 may further comprise an emitting lens 13. The emitting lens 13 may perform beam expansion to the emitted beam. The emitting lens 13 may comprise a diffractive optical element (DOE) which is configured for shaping, separating, or spreading the emitted beam.

The light receiving unit 2 is configured for receiving and sensing the reflected light from the target in the field of view. The light receiving unit 2 comprises photoelectric sensing means 21, wherein the photoelectric sensing means 21 may comprise a two-dimensional array formed by a plurality of photodetectors 812 (see FIG. 8). The two-dimensional array may be arranged in a rectangular, circular or any other shape. The photodetector 812 may be an avalanche photodiode (APD) or a single photon avalanche diodes (SPAD). The photodetector 812 may measure properties such as power, phase or duration of the reflected light and generate a corresponding current output.

The light receiving unit 2 may further comprise a receiving lens 22 disposed in front of the photodetector array on the propagation path of the reflected light. The receiving lens 22 may comprise an imaging system lens so as to focus the reflected beam in front of or behind or exactly on the detection surface of the photodetector array. Particularly, the receiving lens may comprise an image-side telecentric imaging system lens.

The control unit 3 is communicatively coupled with at least one of the light emitting unit 1 and the light receiving unit 2. The control unit 3 may control the light emitted by the light emitting unit 1, adjust the deflection angle of the scan unit 12, or processing the measurements outputted by the light receiving unit 2. The control unit 3 may comprise a feedback control circuit configured for adjusting the light emitting unit 1 and/or the scan unit 12 based on the measurements outputted by the light receiving unit.

The control unit 3 may comprise an integrated circuit (IC), an application-specific integrated circuit (ASIC), a microchip, a microcontroller, a central processor, a graphic processing unit (GPU), a digital signal processor (DSP), a field-programmable gate array (FPGA), or other circuit suitable for executing instructions or performing logic operations. The instruction executed by the control unit 3 may be pre-loaded to an integrated or individual memory. The memory may include a random access memory (RAM), a read-only memory (ROM), a hard disk, an optical disk, a magnetic disk, a flash memory, or other volatile or non-volatile memory, etc. The control unit 3 may comprise one or more control circuits. When a plurality of control circuits are present, individual control circuits may be configured identically or differently, interacting or operating in coordination with each other electrically, magnetically, optically, acoustically, or mechanically.

Figure 2A:
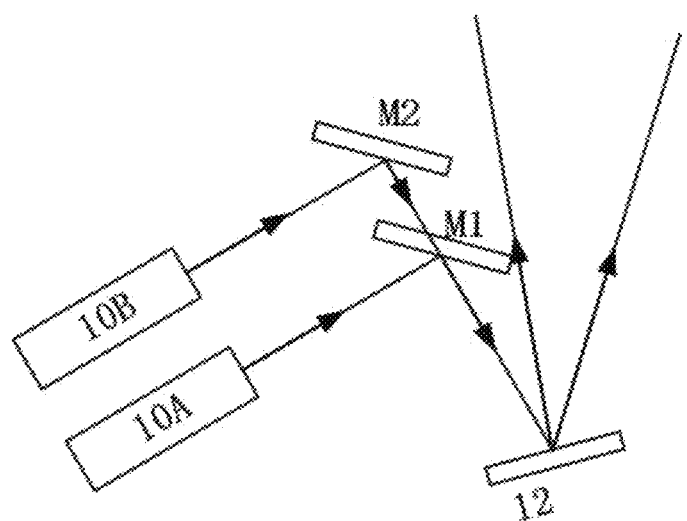
FIG. 2A is a schematic diagram of an optical path of a first embodiment of the light emitting unit according to the present disclosure.

FIG. 2A illustrates a first embodiment of the light emitting unit according to the present disclosure, wherein the light emitting unit 1 comprises a first light source A and a second light source B, a first mirror M1 and a second mirror M2, and a scan unit 12. The first mirror M1 comprises a first surface and a second surface which are oppositely positioned. Light emitted from the first light source A, after being reflected by the first surface of the first mirror M1, reaches the scan unit 12. Light emitted from the second light source B, after being reflected by the second mirror M2, reaches the second surface of the first mirror M1, and then after being transmitted through the second surface of the first mirror M1, reaches the scan unit 12.

FIG. 2A illustrates a schematic diagram of an optical path of a first embodiment of the light emitting unit according to the present disclosure. The light emitting unit 1 comprises a light source A, a light source B, and mirrors M1 and M2 respectively corresponding to the light source A and the light source B. The light emitted from the light source A and the light source B are irradiated, after being respectively reflected by M1 and M2, on the scan unit 12. The scan unit 12 adjusts the angle of reflection of the light incident thereon. The mirror M1 has a first surface and a second surface which are oppositely positioned. The light irradiated on the first surface is completely or mostly reflected. The light irradiated on the second surface is completely or mostly transmitted through M1. For example, M1 may be a piece of glass with a reflective coating applied to the first surface. For another example, M1 is a mirror with a specific reflectivity far greater than its transmittance. For example, the reflectivity of M1 can be 90%, while its transmittance is 10%. As such, even the light intensity of the light which is emitted from the light source B and, after being reflected by M2, reaches M1, is identical to that of the light which is emitted from the light source A and directly reaches M1, the light intensity of the light transmitted through M1 is far lower than the light intensity of the light reflected by M1. The positions of M1 and M2 are arranged such that the optical path along which the light travels after being reflected by M1 overlaps with the optical path along which the light travels after being reflected by M2. Such arrangement may guarantee that the light which is emitted from the light source A and reaches the scan unit 12 falls on a same scan point on the scan unit as the light which is emitted from the light source B and reaches the scan unit.

In normal circumstances, only the light source A operates. When the system detects or knows that the output electrical signals in the optical receiving unit are saturated (e.g., because the emit power of the light source A is too high, or the target is too close, or noise from other LIDAR system is present), the light source A may be automatically switched off to switch to the light source B to work, so as to lower the actual output light power.

Figure 2B:
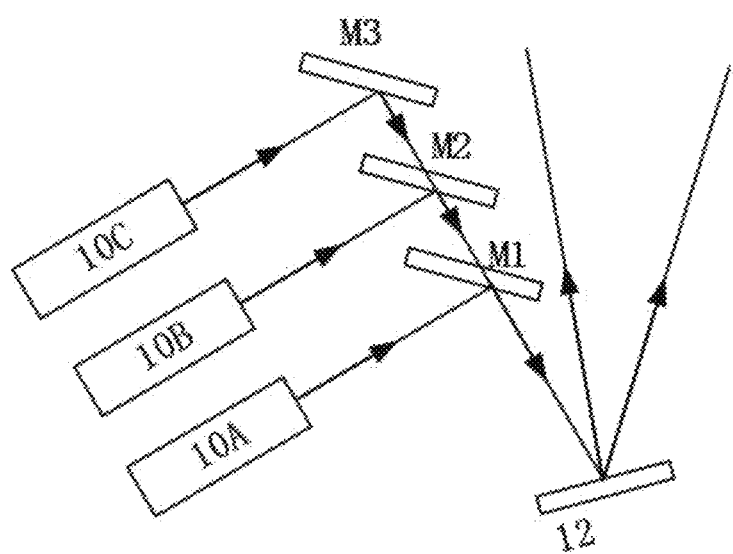
FIG. 2B is a schematic diagram of an optical path of a second embodiment of the light emitting unit according to the present disclosure.

The light emitting unit according to the principle illustrated in FIG. 2A may be expanded to include three or more light sources. Correspondingly, more corresponding mirrors may be provided. For example, FIG. 2B illustrates a circumstance in which the second embodiment of the light emitting unit according to the present disclosure has three light sources. At this point, the light emitted from the light source C, after being reflected by M3, is sequentially transmitted through M2 and M1, and finally reaches the scan unit. Positions of mirrors M1, M2 and M3 are arranged such that the optical paths along which light irradiated thereon from the respective light sources travels after being reflected thereby overlap. At this point, M2 may have same optical properties as those described with respect to M1.

Figure 2C:
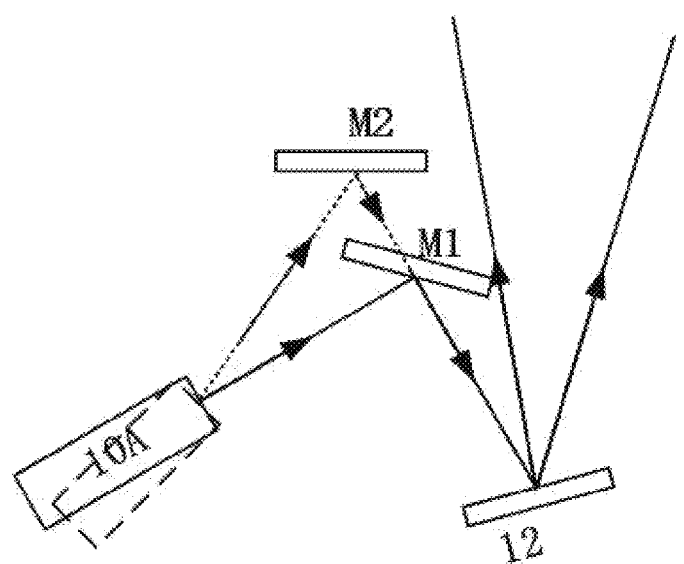
FIG. 2C is a schematic diagram of an optical path of a third embodiment of the light emitting unit according to the present disclosure.

In some embodiments, in practice, it may be unnecessary to use two or more light sources. For example, according to the third embodiment of the light emitting unit of the present disclosure, in FIG. 2C, instead of using the light source B in FIG. 2A, positions of the light source A and M2 may be adjusted such that the light emitted from the light source A, after being reflected by M2, reaches M1. Moreover, the optical path along which the light emitted from the light source A travels after being reflected by M2 overlaps with the optical path along which the light emitted from the light source A travels after being reflected by M1.

Figure 3A:
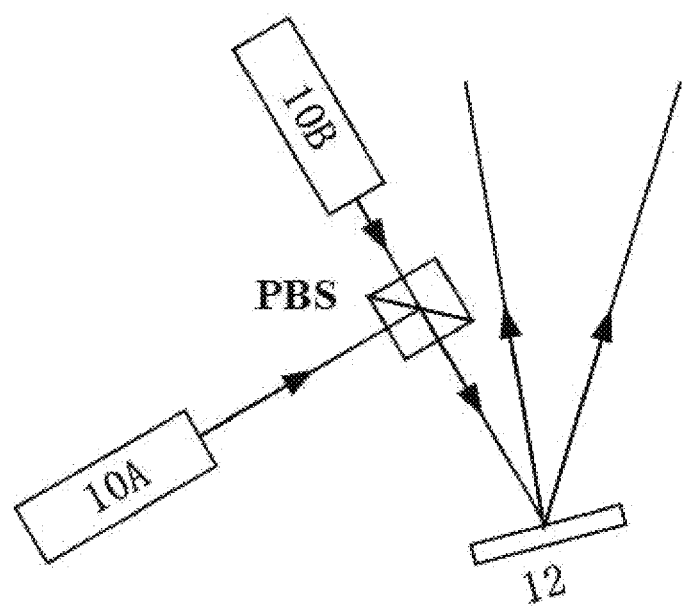
FIG. 3A is a schematic diagram of an optical path of a fourth embodiment of the light emitting unit according to the present disclosure.

FIG. 3A illustrates a fourth embodiment of the light emitting unit according to the present disclosure, wherein the light emitting unit 1 comprises a first light source A and a second light source B, a polarization beam splitter/combiner prism (PBS), and a scan unit 12. The polarization directions of the light respectively emitted from the first light source A and the second light source B are perpendicular to each other. The light emitted from the light source A is completely reflected by the PBS and irradiated to the scan unit 12. The light emitted from the light source B is completely transmitted through the PBS and irradiated to the same scan unit 12. The optical paths along which the light emitted respectively from the light source A and the light source B travels after passing through the PBS overlap. As such, the light emitted from the light source A and reflected by the PBS and the light emitted from the light source B and transmitted through the PBS reach the same scan point on the scan unit.

Figure 3B:
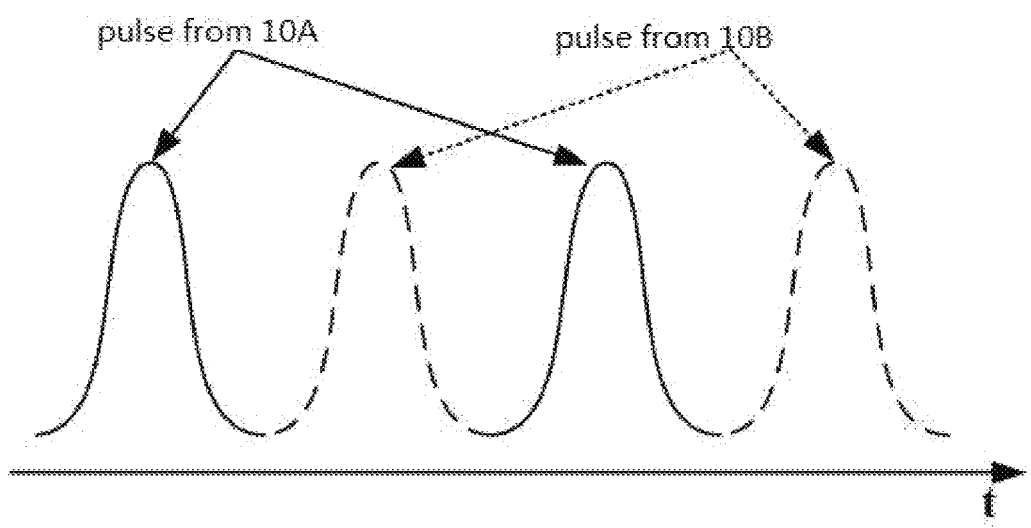
FIG. 3B is a schematic diagram of a pulse light source frequency generated by a fourth embodiment of the light emitting unit according to the present disclosure.

The light source A and the light source B may be configured to operate alternately at a certain time interval. The light source A and the light source B may be pulse light sources. The light source A and the light source B may operate alternately at a frequency twice their pulse light source frequency (as shown in FIG. 3B). As such, the pulse light frequency irradiated to the scan unit is doubled, thereby enhancing measurement precision of the LIDAR.

Figure 4:
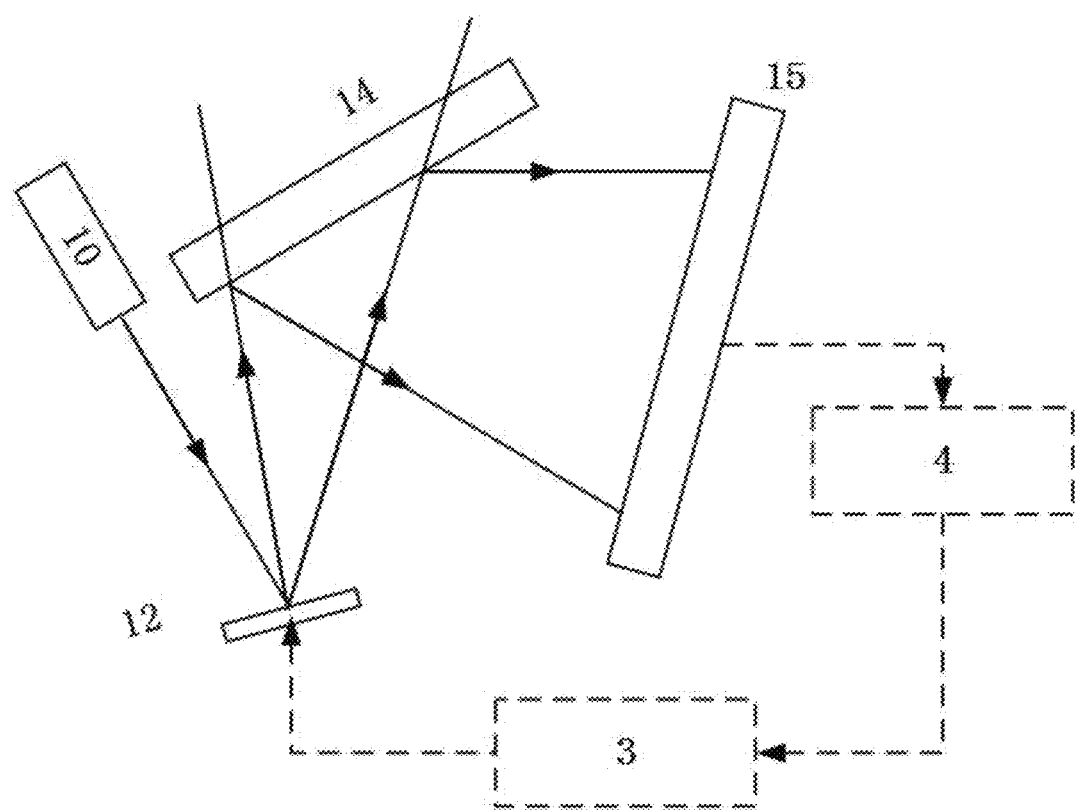
FIG. 4 is a structural diagram of a fifth embodiment of the light emitting unit according to the present disclosure.

FIG. 4 illustrates a fifth embodiment of the light emitting unit according to the present disclosure, wherein the light emitting unit 1 may further comprise a light source 10, a scan unit 12, an optical element 14, and a detector assembly 15. The light emitted from the light source 10, after being reflected by the scan unit 12, reaches the optical element 14, wherein most of the light is transmitted through the optical element 14 so as to detect the target. A small amount of light, after being reflected by the optical element 14, reaches the detector assembly 15. The detector assembly 15 may be an arrangement of a plurality of same photodetectors. The light reaching the detector assembly 15 is received by each of the plurality of photodetectors to output photocurrent. The deflection angle of the scan unit 12 may be computed based on the photocurrent outputted by each of the photodetectors 15.

For example, the optical element 14 may be a glass plate with a relatively low reflectivity ranging, for example, from 0.1% to 3%. For example, the detector assembly 15 may be a 4-quadrant photodetector. The 4-quadrant photodetector refers to a photodetector arranged by four photodiodes with completely identical properties according to an orthogonal coordinate requirement. With variation of the pendulum angle of the scan unit 12, positions of the spots falling on the 4-quadrant photo detector also vary, such that the light signal intensities received on the 4 quadrants are different. The deflection angle of the scan unit 12 may be calculated based on the difference value.

In the LIDAR system, the light emitting unit 1 of FIG. 4 enables real-time monitoring of the deflection angle of the scan unit 12. As shown in FIG. 4, the LIDAR system may also comprise a processing circuit 4 connected to the detector assembly and a control unit 3 for controlling the deflection angle of the scan unit. The processing circuit 4 may compute the real-time deflection angle of the scan unit based on the photocurrent outputted by the photodetector assembly. The processing circuit 4 is communicatively coupled with the control unit 3. The processing unit 4 transmits the computed deflection angle to the control unit 3. The control unit 3 compares the computed deflection angle with the expected deflection angle previously applied to the scan unit 12 such that the error may be determined and compensated.

Figure 5:
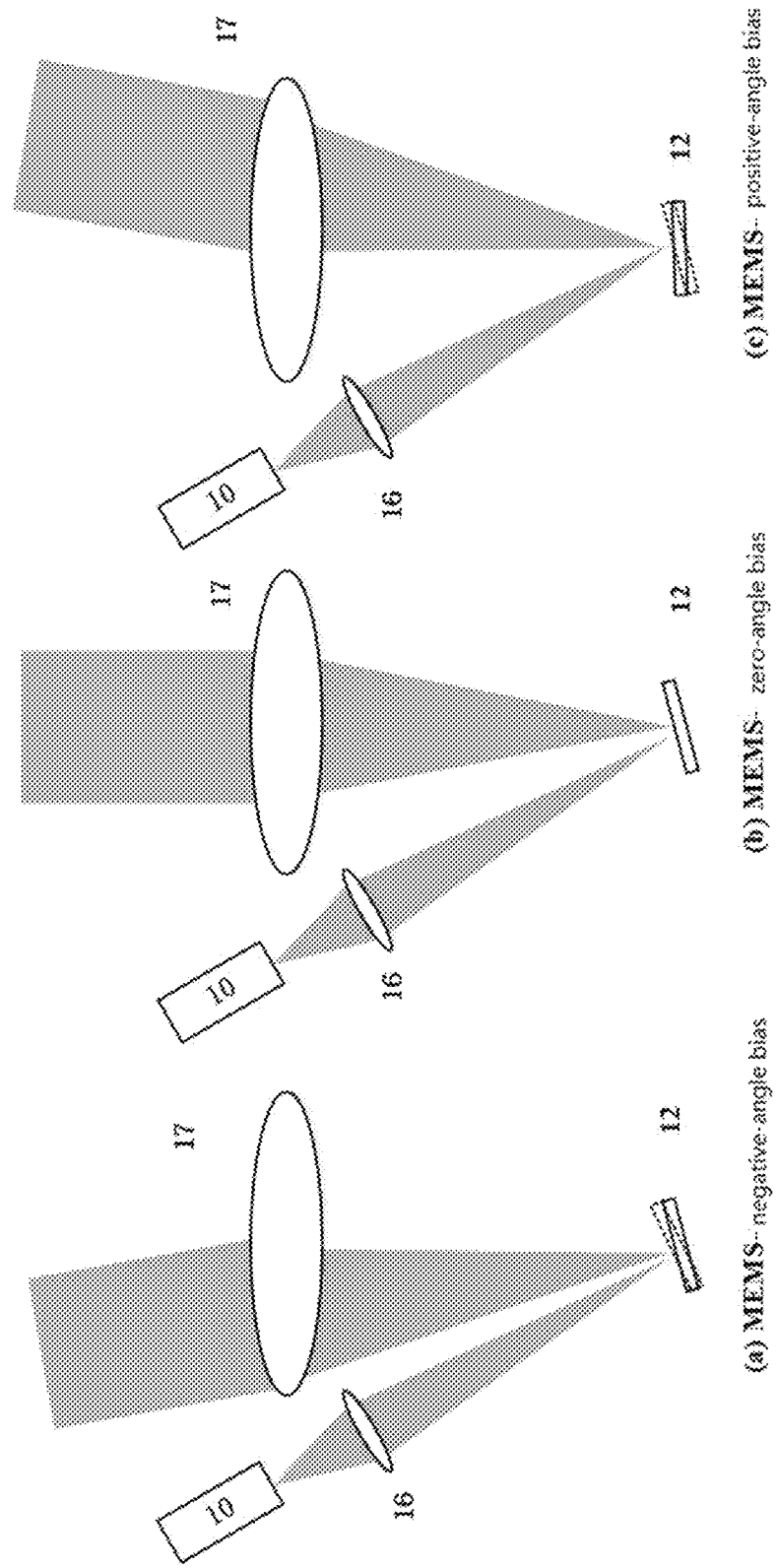
FIG. 5 is an operating principle diagram of a sixth embodiment of a light emitting unit according to the present disclosure.

FIG. 5 illustrates a sixth embodiment of the light emitting unit according to the present disclosure, wherein the light emitting unit 1 comprises a light source 10, a focusing lens 16, a scan unit 12, and a collimating lens 17. The scan unit 12 is a MEMS mirror. Light emitted from the light source 10 is focused by the focusing lens 16 onto the scan unit 12. The focal point of the focusing lens 16 may be positioned in front of, on, or behind the scan unit 12. The light, after being reflected off the scan unit 12, is transmitted through the collimating lens 17, and then reaches an object in the field of view to be detected. The diameter of the spot collimated by the collimating lens 17 is greater than the diameter of the scan unit 12.

As shown in FIG. 5, the focused light incident on the MEMS mirror, after being deflected with different angles (negative angle, zero angle, and positive angle), is transmitted through correspondingly different portions of the collimating lens 17, thereby detecting different parts of the to-be-detected field of view. With the focusing lens 16, the size of the spot incident onto the MEMS mirror can be reduced, thereby enhancing the precision of controlling the beam deflection by the scan unit 12. Further, through expansion with the collimating lens 17, divergence of the spot is suppressed, power efficiency is improved, and the detection range is accordingly expanded.

Figure 6:
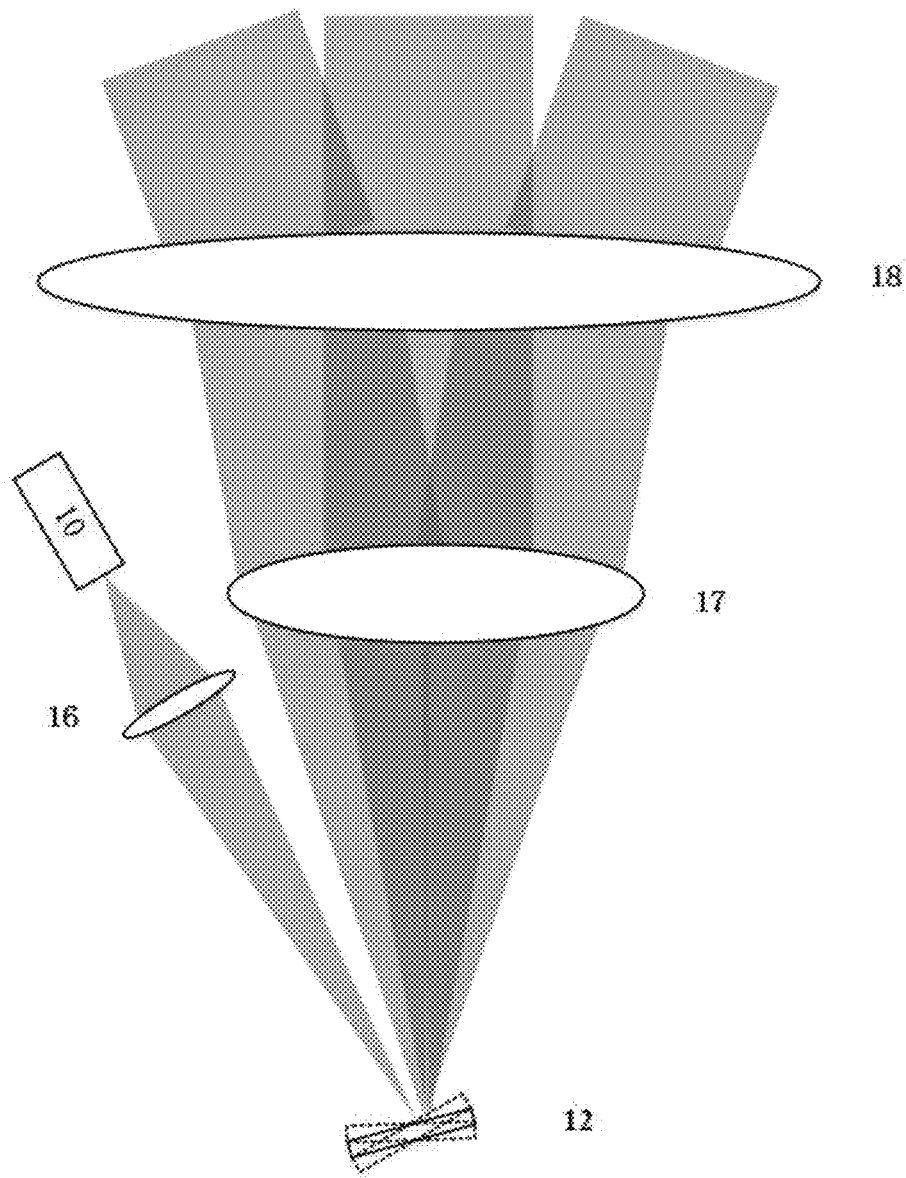
FIG. 6 is an operating principle diagram of a seventh embodiment of the light emitting unit according to the present disclosure.

FIG. 6 illustrates a seventh embodiment of the light emitting unit according to the present disclosure, wherein the light emitting unit 1 may further comprise a beam expander 18 on the optical path behind the collimating lens 17 so as to further expand the spot size and detection range. As such, even the MEMS mirror is deflected by a very small angle, detection within the full field-of-view range can also be implemented.

Figure 7:
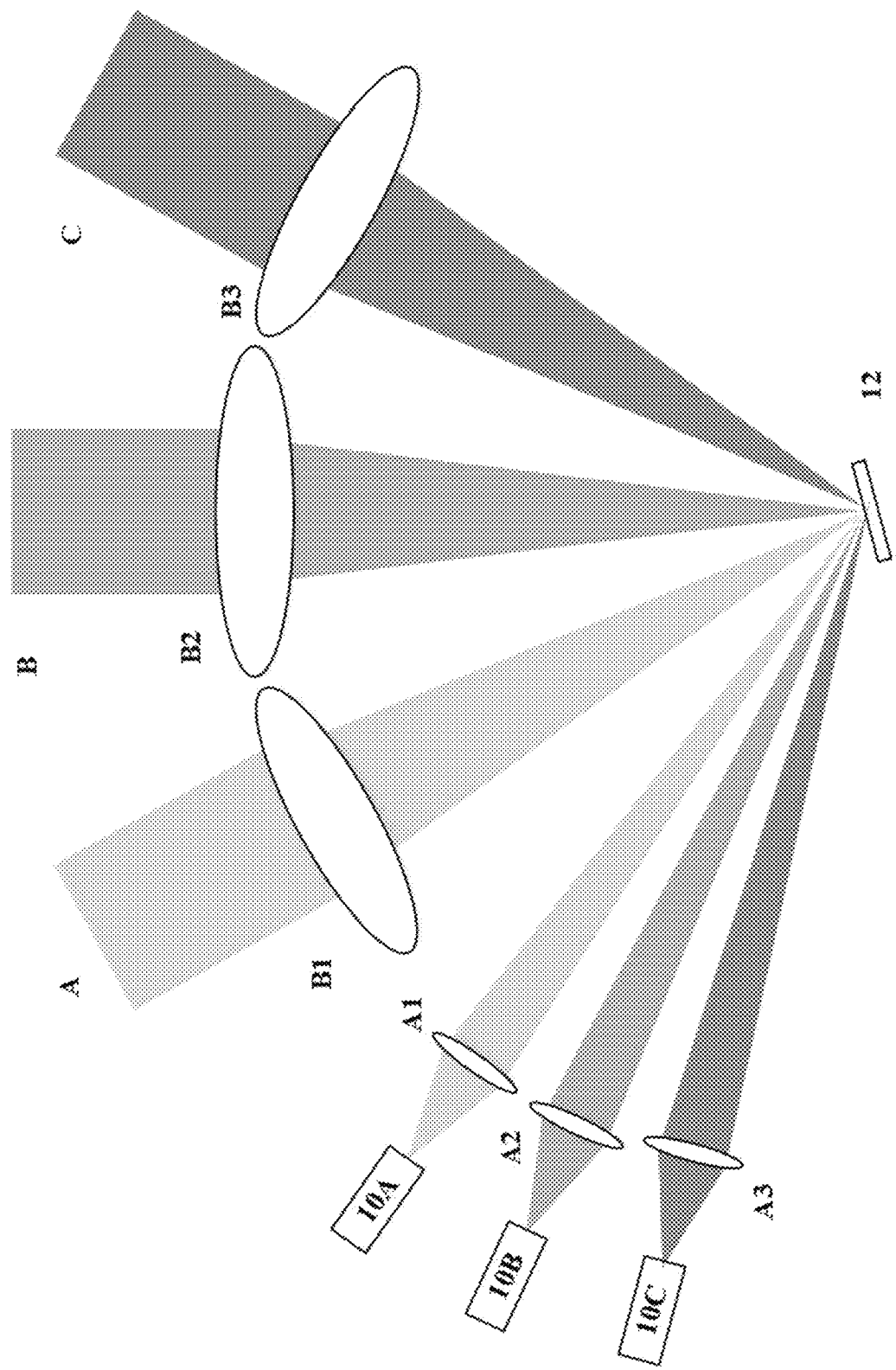
FIG. 7 is an operating principle diagram of an eighth embodiment of the light emitting unit according to the present disclosure.

Based on the principle of FIG. 5, FIG. 7 illustrates an eighth embodiment of the light emitting unit according to the present disclosure, wherein the light emitting unit 1 may further comprise a plurality of sets of a combination of light sources, focusing lens A and a collimating lens. As shown in FIG. 7, light emitted from the plurality of sets of light sources are respectively focused on the same scan unit 12 (e.g., MEMS mirror) via their respective focusing lens (lens A1~A3). The plurality of sets of light sources may be positioned with a certain fixed angle. For example, the included angle between the optical path from the light source A to the MEMS mirror and the optical path from light source B to the MEMS mirror is α, and the included angle between the optical path of the light source B and the optical path of the light source C is also α. Likewise, focuses of the respective focusing lens may be positioned in front of, on, or behind the scan unit 12.

At a certain scanning moment, the scan unit 12 lies at a fixed deflection angle. Because certain differences exist between incident angles of the light reaching the scan unit 12 from respective light sources A~C, their reflected angles also have certain differences. The light from respective light sources A~C, after being reflected by the scan unit 12, is directed to different portions of the to-be-detected field of angle. In other words, the light emitted from each light source enables detection of a certain portion of to-be-detected field of view. Then, a combination of a plurality of light sources can cover the entire to-be-detected field of view. Like FIG. 5, the light reflected by the scan unit 12 may be collimated by respective collimating lens (lens B1~B3) so as to improve the detection range of the output light from each light source. The diameter of the spot of the beam from each light source after being collimated by the collimating lens is greater than that of the scan unit 12.

Figure 8:
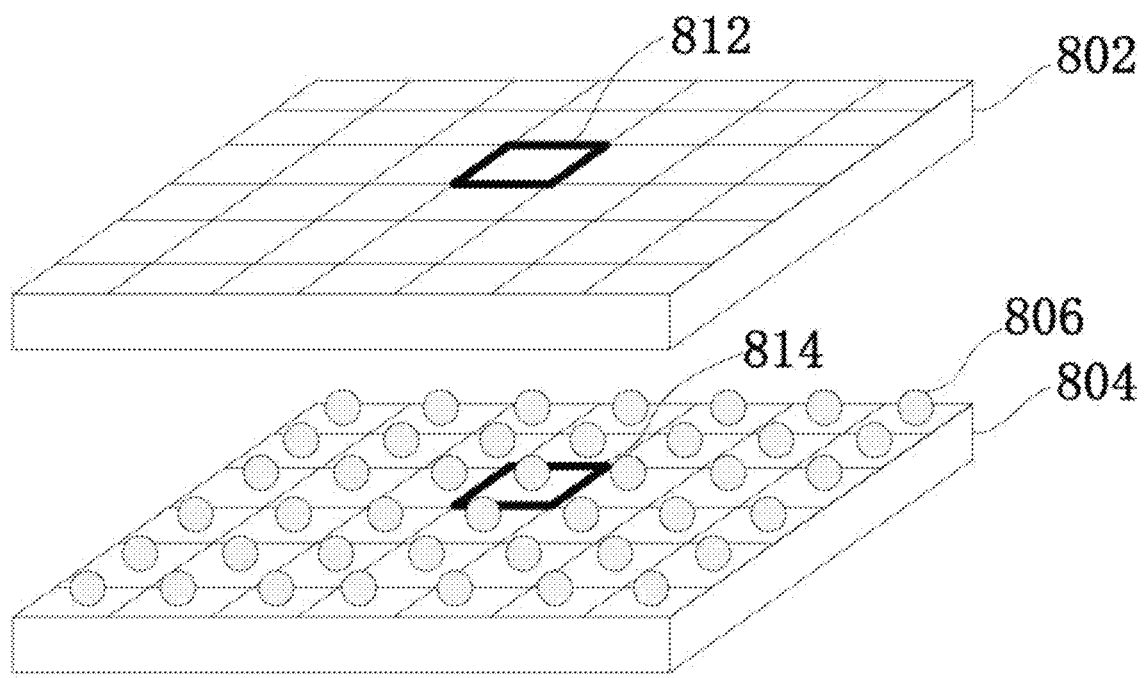
FIG. 8 is a structural diagram of photoelectric sensing means of the first embodiment of the light receiving unit according to the present disclosure.

Referring to FIG. 8, according to the first embodiment of the light receiving unit of the present disclosure, photoelectric sensing means 21 of the light receiving unit 2 further comprises a two-dimensional array formed by a plurality of readout circuit units. Each readout circuit unit 814, which is coupled to a corresponding photodetector 812, is configured for processing (e.g., converting, amplifying, filtering, sampling, comparing, and storing, etc.) the current signal outputted by the photodetector 812. Each readout circuit unit 814 includes a individual selector switch 816.

FIG. 8 illustrates a structural diagram of photoelectric sensing means 21 of the first embodiment of the light receiving unit according to the present disclosure. The photoelectric sensing means 21 comprises a two-dimensional detector array 802, a two-dimensional readout circuit array 804, and a plurality of electrical connectors 806 for coupling the detector array and the readout circuit array. The detector array 802 includes a plurality of photodetectors 812 arranged in a row-column manner, wherein the photodetectors for example may be APDs. Correspondingly, the readout circuit array 804 comprises a plurality of readout circuit units 814 arranged in a row-column manner. The electrical connector 806 may couple the photodetector 812 and the corresponding read-out circuit unit 814 by bump-bonding or bridge-bonding. The substrate material for the detector array 802 may be silicon, germanium, indium gallium arsenic/indium phosphor, mercury cadmium telluride, etc. The readout circuit array 804 may be based on the CMOS process.

Figure 9A:
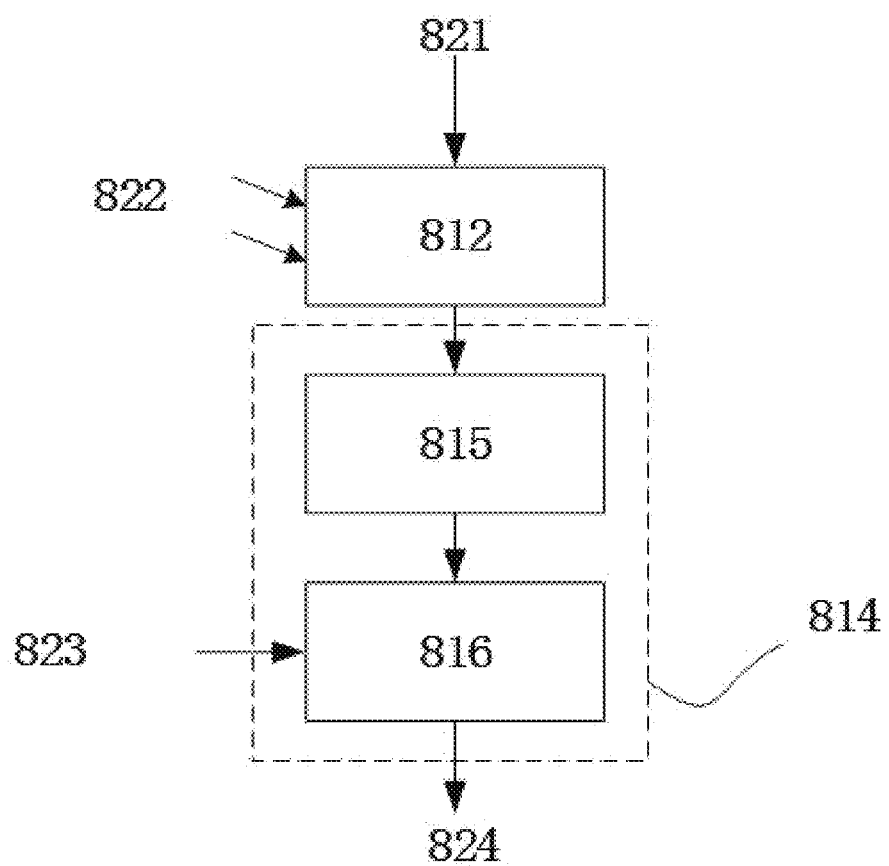
FIG. 9A is an operating principle diagram of the photoelectric sensing means of the light receiving unit in FIG. 8.

FIG. 9A illustrates an operating principle diagram of the first embodiment of the light receiving unit according to the present disclosure, where a circuit formed by each photodetector 812 and the corresponding read-out circuit unit 814 in FIG. 8 is shown. Under the action of an actuating signal 821, the photodetector 812 receives the reflected light 822 from the target object and generates an output current. The readout circuit unit 814 includes a selector switch 816. The selector switch 816 is switched on or off under the action of the select control signal 823 so as to enable or disable the output current of the photodetector 812 to be outputted or from being outputted by the output signal 824 terminal. The readout circuit unit 814 may further comprise a trans-impedance amplifier 815 configured for performing low-noise amplification with respect to the photocurrent (always very weak) outputted by the photodetector 812. The readout circuit unit 814 may further comprise one or more of a variable gain amplifier (VGA), a filter, and an AC/DC convertor.

Figure 9B:
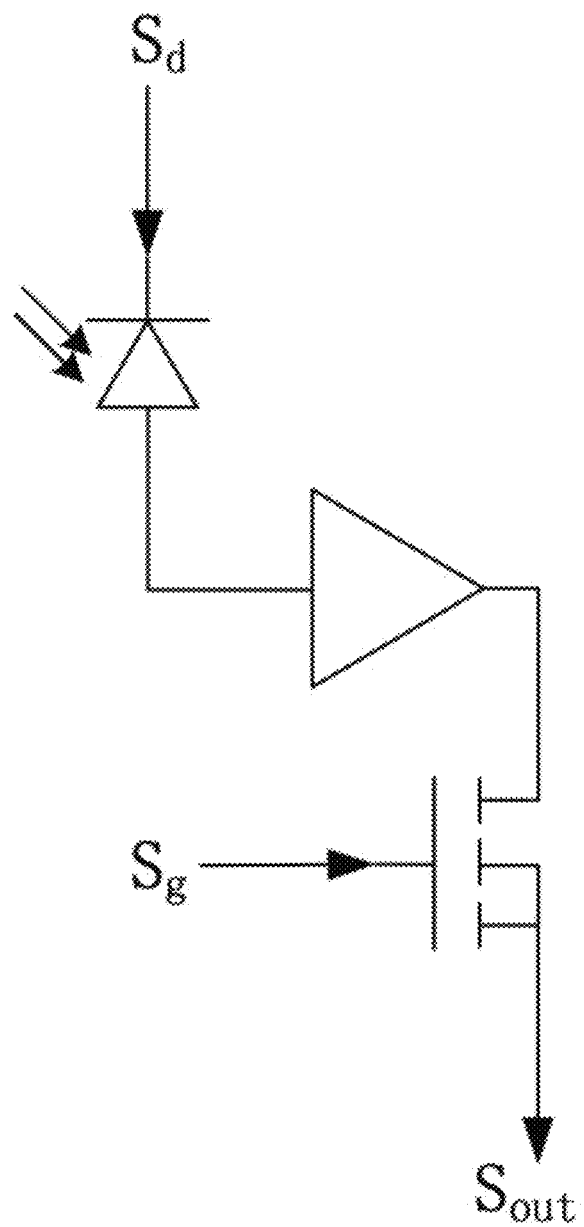
FIG. 9B is a circuit principle diagram when the selector switch in FIG. 9A is a field-effect transistor.

FIG. 9B is a circuit principle diagram when the selector switch 816 is a field-effect transistor FET, where $S_d$ denotes the actuation signal from the photodetector, $S_g$ denotes the gate control signal of the FET, and $S_{out}$ denotes the output signal of the readout circuit unit. Preferably, the selector switch 816 may comprise a MOSFET or JFET with a fast switching speed.

The control unit 3 of the LIDAR system according to the present disclosure is coupled to the light receiving unit 2. The control unit 3 is configured to estimate the spot size and angle of the reflected light at the light receiving surface of the light receiving unit 2; provide a select control signal to each readout circuit unit 814 in the readout circuit array of the light receiving unit 2 so as to switch on or off the selector switch 816, thereby enabling or disabling the output signals from the readout circuit units 814. Further, the control unit 3 is further coupled to the scan unit 12 and is configured to provide a scan control signal to the scan unit 12 so as to control the deflection angle of the laser beam from the light source 10 of the light emitting unit 1. The spot size and angle of the reflected light at the light receiving surface of the light receiving unit 2 are estimated by the control unit 3 based on the scan control signal.

Figure 10:
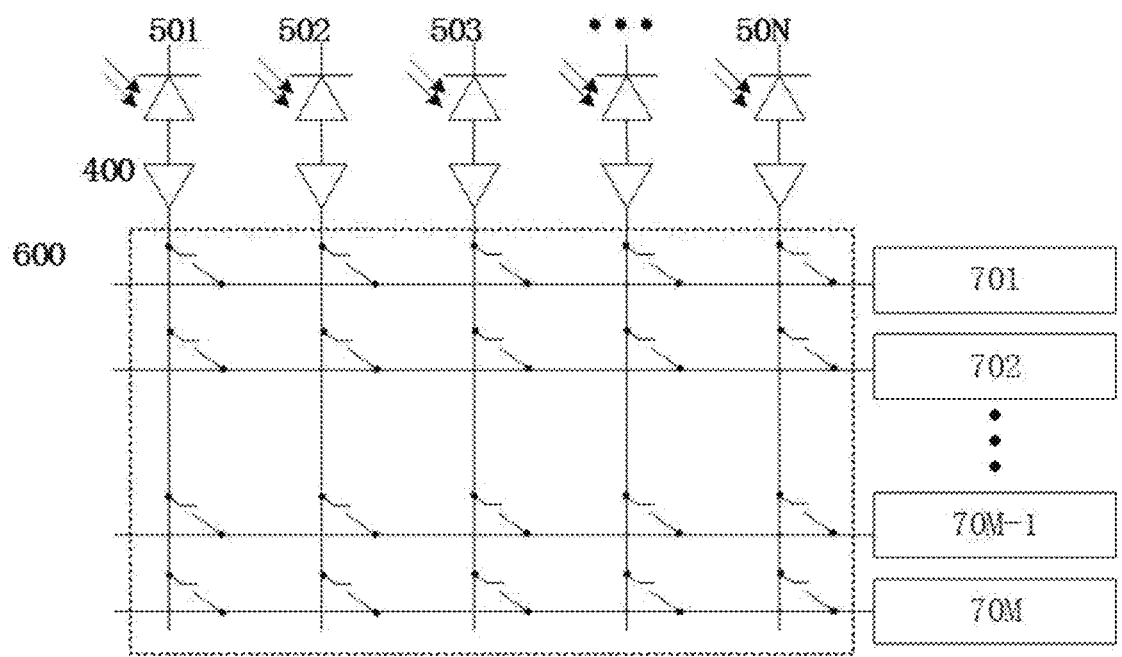
FIG. 10 is a circuit principle diagram of photoelectric sensing means of the second embodiment of the light receiving unit according to the present disclosure.

FIG. 10 illustrates the second embodiment of the light receiving unit according to the present disclosure, wherein the readout circuit array 804 comprises N number of trans-impedance amplifiers corresponding to N number of photodetector array units, M number of post-processing circuit units, and N*M switch array coupled between the N number of trans-impedance amplifiers and the M number of post-processing BPC units. Each switch unit in the selector switch array may be implemented by FET, MOSFET, and BJT, etc. In FIG. 10, the avalanche photodiode APD1~N are respectively represented by 501, 502, 503~50N; the N*M switch array is represented by 600, the post-processing circuits 1~M are respectively represented by 701, 702, . . . , 70M−1, 70M, and TIA is represented by 400.

With the N*M selector switch array, the signals outputted by the trans-impedance amplifier 815 may be outputted, in any combination manner, to the M number of post-processing circuit units. The LIDAR system with the light receiving unit 2 of this structure can realize wide-angle detection.

In some circumstances, the light receiving unit 2 further comprises a receiving lens 22 and an optical filter (not shown) disposed between the receiving lens 22 and the photodetector array 802. The optical filter enables light of a specific wavelength to pass through, while blocking the background light or the light from other stray light sources.

According to the third embodiment of the light receiving unit of the present disclosure, the photoelectric sensing means 21 of the light receiving unit 2 further comprises an optical shutter 23. The optical shutter 23 comprises a light-transmitting portion and a light-blocking portion. The light through the light-transmitting portion of the optical shutter 23 reaches each photodetector on the detector array 802. The position of the light-transmitting portion on the optical shutter 23 is electrically adjustable.

Figure 11:
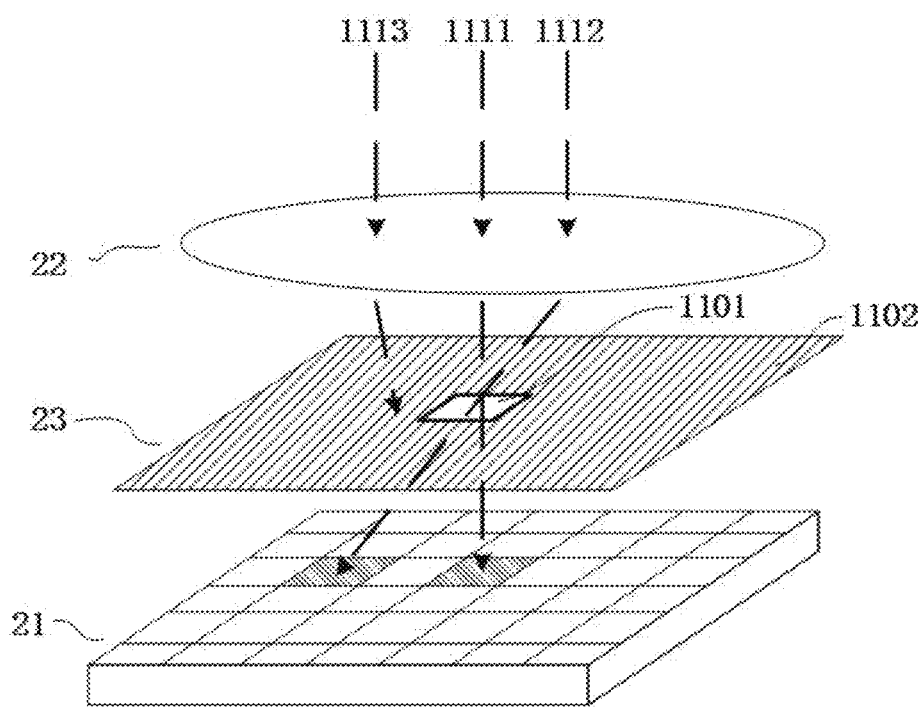
FIG. 11 is a structural diagram of photoelectric sensing means of the third embodiment of the light receiving unit according to the present disclosure.

As illustrated in FIG. 11, the optical shutter 23 may be disposed between the receiving lens 22 and the detector array 802 of the LIDAR system. The optical shutter 23 comprises a light-transmitting portion 1101 and a light-blocking portion 1102. The reflected light 1111 and 1112 from the target, after being refracted by the receiving lens 22 and transmitted through the light-transmitting portion 1101, reaches the corresponding photodetector 812 on the detector array 802. The noise 1113, after being refracted by the receiving lens 22, is blocked by the light-blocking portion 1102 such that it cannot reach the detector array 802. As such, the intensity of the noise reaching the detector array 802 may be suppressed and the SNR of the output signal may be enhanced.

When the LIDAR scans the object in the field of view, the incident angles of the reflected light 1111 and 1112 vary with time. The position of the light-transmitting portion 1101 on the optical shutter 23 may vary under the action of the control signal so as to guarantee that the desired reflected light can always reach the detector array 802 while always suppressing the noise 1113.

Figure 12:
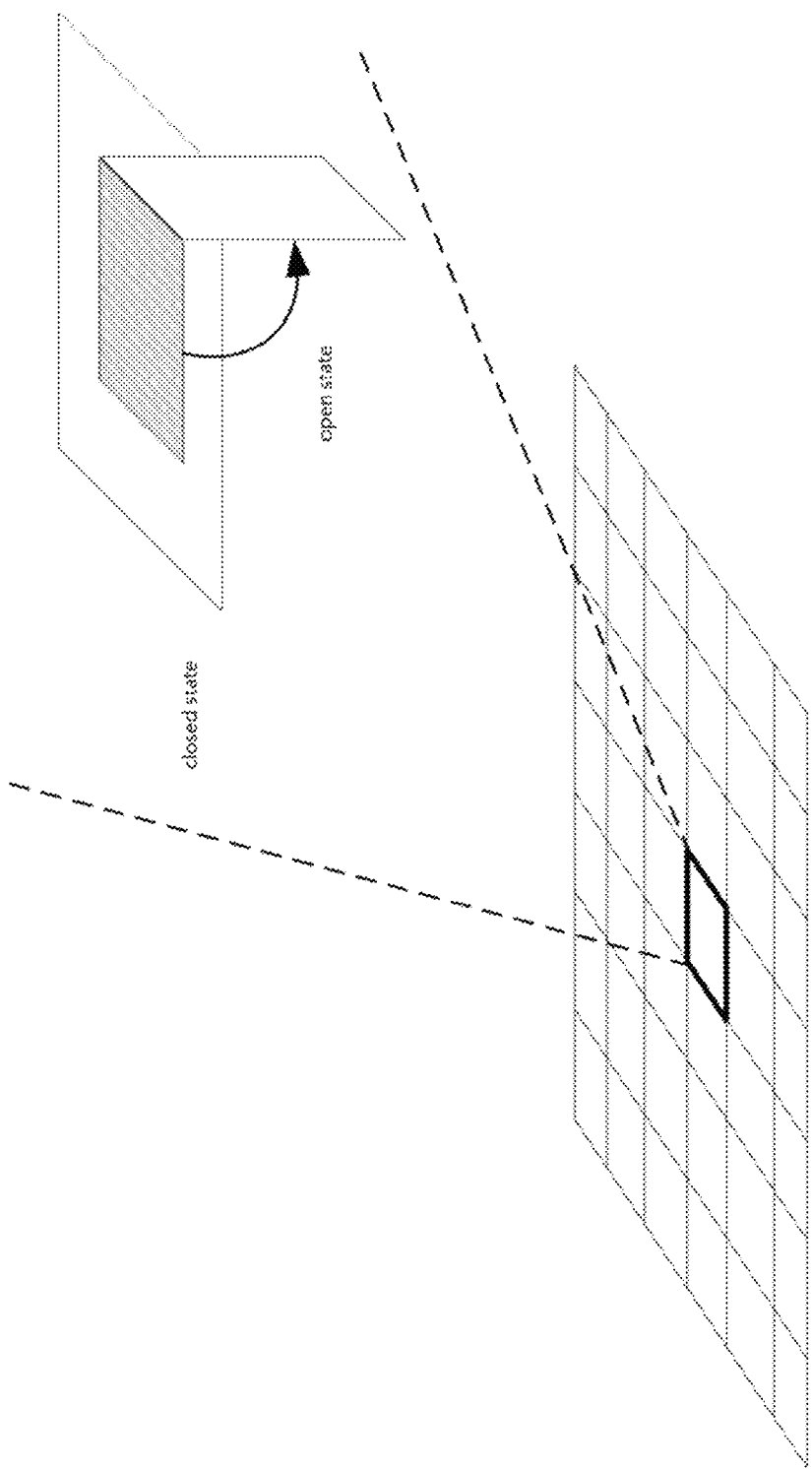
FIG. 12 is an operating principle diagram of one operating way of the optical shutter in FIG. 11.

One way of implementing the optical shutter is a MEMS-based micro-shutter array. As shown in FIG. 12, each micro-shutter unit in the micro-shutter array has an independently electrically controllable light-blocking assembly. Under the action of the control signal, the light-blocking assembly changes from a closed state to an open state; then the micro-shutter unit allows light to pass through. Each micro-shutter unit in the micro-shutter array may be aligned with the corresponding photodetector 812 in the detector array 802.

Figure 13:
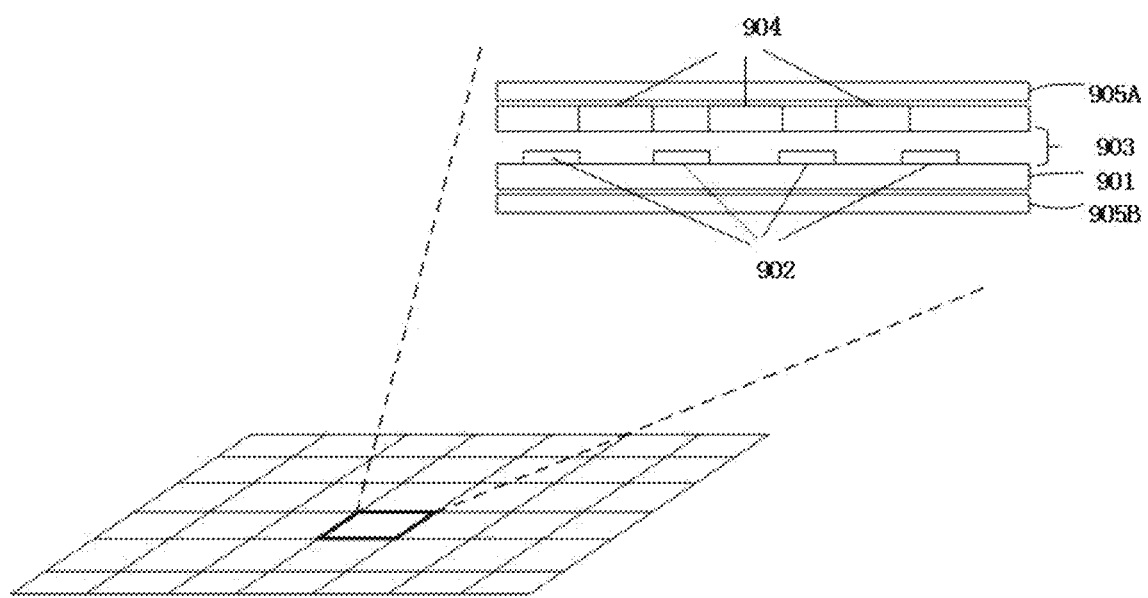
FIG. 13 is an operating principle diagram of another operating way of the optical shutter in FIG. 11.

Another way of implementing the optical shutter is an LCD-based shutter array. As shown in FIG. 13, the shutter array comprises a plurality of individual LCD elements. Each LCD element may comprise a glass substrate 901, an ITO electrode 902, a liquid-crystal layer 903, a color filter 904, and upper and lower polarizers 905A, 905B. By applying a voltage signal, via the ITO electrode 902, to the liquid-crystal molecules in the liquid-crystal layer 903, the light polarization direction is changed; and in conjunction with the polarizers 905A, 905B, light transmission or blocking is implemented.

The control unit 3 of the LIDAR system according to the present disclosure is coupled to the light receiving unit 2. The control unit 3 is configured to: estimate the spot size and angle of the reflected light at the optical shutter 23; and provide an electrical control signal to the optical shutter 23 of the light receiving unit 2 based on the estimated spot size and angle so as to adjust the position of the light-transmitting portion on the optical shutter 23. Further, the control unit 3 is further coupled to the scan unit 12 and is configured to provide a scan control signal to the scan unit 12 so as to control the deflection angle of the laser beam from the light source 10 of the light emitting unit 1. The spot size and angle of the reflected light at the optical shutter 23 are estimated by the control unit 3 based on the scan control signal.

The embodiments described above are only preferred embodiments of the present disclosure, intended for illustrating, rather than limiting, the technical solution of the present disclosure, such that the protection scope of the present disclosure is not limited thereto. Although the present disclosure has been described in detail with reference to the foregoing embodiments, a person of normal skill in the art should understand that any skilled person in the art may make modifications to or may readily contemplate variations to the technical solution disclosed above, or make equivalent substitution to part of technical features therein; while such modifications, variations or substitutions cannot cause the essence of the corresponding technical solution to depart from the spirit and scope of the technical solutions of the embodiments of the present disclosure, but all fall into the protection scope of the present disclosure. Therefore, the protection scope of the present disclosure should be limited by the appended claims.

The invention claimed is:
1. A light detection and ranging (LIDAR) system, comprising:

a light emitting unit configured for emitting light to a target, wherein the light emitting unit comprises a light source and a scan unit, the scan unit being configured for reflecting the light from the light source with a controllable deflection angle so as to scan the target;
a light receiving unit configured for receiving the light reflected from the target and outputting measurements, wherein the light receiving unit comprises a sensor comprising:
  a two-dimensional photodetector array including a plurality of photodetectors; and
  a two-dimensional readout circuit array including a plurality of readout circuit units;
  wherein the plurality of readout circuit units are in one-to-one correspondence with the plurality of photodetectors, each readout circuit unit including a selector switch; and
a control unit communicatively coupled to the light emitting unit and the light receiving unit, wherein the control unit is configured for controlling the light emitting unit to process the measurements, and controlling deflection angles of the scan unit;
wherein an optical path along which light emitted from the light emitting unit travels to the target is non-coaxial with an optical path along which light reflected from the target travels to the light receiving unit,
wherein the light source comprises:
  a first light source configured for emitting first light;
  a second light source configured for emitting second light; and
wherein the scan unit is configured to reflect the first light and the second light incident thereon with a deflection angle;
wherein the light emitting unit further comprises:
  a first mirror including a first surface and a second surface which are positioned oppositely, wherein the first light, after being reflected by the first surface of the first mirror, reaches the scan unit; and
  a second mirror configured for reflecting the second light, wherein the reflected second light, after being transmitted through the first mirror via the second surface of the first mirror, reaches the scan unit,
wherein an optical path along which the first light reflected off the first mirror travels overlaps with an optical path along which the second light reflected off the second mirror travels,
wherein the light emitting unit is arranged such that the light intensity of the second light transmitted through the first mirror is lower than that of the first light reflected by the first mirror, and
wherein the control unit is configured to:
  enable only the first light source; and
  in response to a determination that measurements from the light receiving unit are saturated, automatically switch off the first light source and enable the second light source.

2. The LIDAR system according to claim 1, wherein the scan unit is selectable from a group consisting of: a mirror, a prism, a mechanical mirror, polarization grating, or an optical phased array.

3. The LIDAR system according to claim 1, wherein the light emitting unit further comprises an emitting lens configured for shaping, separating, or spreading light reflected from the scan unit, and
an optical assembly, wherein the optical assembly is configured for collimating or focusing the light emitted from the light source.

4. The LIDAR system according to claim 1, wherein the light source further comprises:
  a third light source configured for emitting third light;
  wherein the light emitting unit further comprises:
  a third mirror configured for reflecting the third light,
  wherein the second mirror comprises a first surface and a second surface which are oppositely positioned, the second light is reflected by the first surface of the second mirror, and the reflected third light, after being sequentially transmitted through the second surface of the second mirror and the second surface of the first mirror, reaches the scan unit; and
  wherein an optical path along which the third light reflected off the third mirror travels overlaps with an optical path along which the second light reflected off the second mirror travels.

5. The LIDAR system according to claim 1, wherein the light emitting unit further comprises:
  an optical element configured for allowing part of reflected light incident thereon from the scan unit to be reflected while allowing the other part to be transmitted through; and
  a second photodetector assembly comprising an arrangement of a second plurality of photodetectors, the second photodetector assembly being configured for receiving the reflected light from the optical element and outputting photocurrent,
  wherein the light emitting unit further comprises a processing circuit, the processing circuit being coupled to the second photodetector assembly, wherein the processing circuit computes a deflection angle of the scan unit based on the photocurrent outputted by each photodetector in the second plurality of photodetectors,
  wherein the control unit is coupled to the processing circuit and the scan unit and is configured to adjust the scan unit based on the computed deflection angle.

6. The LIDAR system according to claim 1, wherein the light emitting unit further comprises:
  a focusing lens disposed between the light source and the scan unit, the focusing lens being configured for focusing the light emitted from the light source onto the scan unit; and
  a collimating lens configured for collimating the light reflected from the scan unit.

7. The LIDAR system according to claim 1, wherein the sensor further comprises a plurality of electrical connectors configured for coupling the two-dimensional photodetector array and the two-dimensional readout circuit array,
  wherein each electrical connector couples each photodetector and the corresponding readout circuit unit by bump-bonding or bridge-bonding.

8. The LIDAR system according to claim 1, wherein each readout circuit unit further comprises a trans-impedance amplifier, wherein photocurrent outputted from each photodetector is outputted through a corresponding trans-impedance amplifier and the selector switch.

9. The LIDAR system according to claim 1, wherein the plurality of readout circuit units are based on a CMOS process,
  wherein the selector switch is MOSFET or JFET.

10. The LIDAR system according to claim 1, wherein the selector switch is switched on or off based on a select control signal,
  wherein the select control signal is based on at least one of a spot size and an angle of light received at a corresponding photodetector.

11. The LIDAR system according to claim 1, wherein the first light source and the second light source refer to a same light source, and a position of the same light source is adjustable such that the optical path along which the light emitted at a first position travels after being reflected by the first mirror overlaps with the optical path along which the light emitted at a second position travels after being reflected by the second mirror.

\* \* \* \* \*